United States Patent
Hong et al.

(10) Patent No.: US 10,488,969 B2
(45) Date of Patent: Nov. 26, 2019

(54) ELECTRONIC DEVICE AND METHOD OF DRIVING SAME

(71) Applicant: Samsung Display Co., Ltd., Yongin-si (KR)

(72) Inventors: Won-ki Hong, Suwon-si (KR); Jihong Park, Suwon-si (KR); Jongseo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 132 days.

(21) Appl. No.: 15/247,527

(22) Filed: Aug. 25, 2016

(65) Prior Publication Data
US 2017/0068370 A1   Mar. 9, 2017

(30) Foreign Application Priority Data

Sep. 3, 2015 (KR) .................. 10-2015-0125020

(51) Int. Cl.
*G06F 3/041* (2006.01)
*G06F 3/0354* (2013.01)
*G06F 3/038* (2013.01)
*G06F 1/16* (2006.01)

(52) U.S. Cl.
CPC .......... *G06F 3/0414* (2013.01); *G06F 1/1616* (2013.01); *G06F 1/1641* (2013.01); *G06F 1/1643* (2013.01); *G06F 3/0383* (2013.01); *G06F 3/03545* (2013.01); *G06F 3/0418* (2013.01)

(58) Field of Classification Search
CPC .. G06F 1/1616; G06F 1/1641; G06F 3/03545; G06F 3/0414
See application file for complete search history.

(56) References Cited

U.S. PATENT DOCUMENTS

| | | | |
|---|---|---|---|
| 5,691,513 A | 11/1997 | Yamamoto et al. | |
| 2004/0189611 A1* | 9/2004 | Matsumoto | G06K 9/0002 345/173 |
| 2006/0007164 A1 | 1/2006 | Liu et al. | |
| 2008/0150906 A1* | 6/2008 | Grivna | G06F 3/0416 345/173 |

(Continued)

FOREIGN PATENT DOCUMENTS

| | | |
|---|---|---|
| JP | 2010-238046 | 10/2010 |
| KR | 10-2014-0052623 | 5/2014 |

(Continued)

*Primary Examiner* — Abbas I Abdulselam
(74) *Attorney, Agent, or Firm* — H.C. Park & Associates, PLC

(57) ABSTRACT

An electronic device includes a display device including a display panel, a touch panel, and a touch sensing circuit configured to sense a touch input. The electronic device also includes an input pen configured to provide, to the touch sensing circuit, information on intensity of pressure applied to the display device. The touch panel includes touch pressure sensors and signal lines connected to the touch pressure sensors. Each touch pressure sensor has an area per unit length that increases along an extended direction of each touch pressure sensor. Each touch pressure sensor has a resistance that varies with an intensity of pressure and an area of pressure applied to the touch pressure sensors.

19 Claims, 16 Drawing Sheets

(56) References Cited

U.S. PATENT DOCUMENTS

| | | | |
|---|---|---|---|
| 2009/0065269 A1* | 3/2009 | Katsurahira | G06F 1/32 178/19.06 |
| 2009/0284495 A1* | 11/2009 | Geaghan | G06F 3/0416 345/174 |
| 2009/0309616 A1* | 12/2009 | Klinghult | G06F 3/044 324/686 |
| 2012/0235934 A1 | 9/2012 | Kawasaki et al. | |
| 2013/0257769 A1* | 10/2013 | Sheik-Nainar | G06F 3/0488 345/173 |
| 2013/0285970 A1 | 10/2013 | Ahn et al. | |
| 2013/0335359 A1* | 12/2013 | Shima | G06F 1/1616 345/173 |
| 2015/0087355 A1* | 3/2015 | Jouin | G06F 3/1438 455/552.1 |
| 2015/0220111 A1* | 8/2015 | McLaughlin | G06F 1/1618 345/173 |

FOREIGN PATENT DOCUMENTS

| | | |
|---|---|---|
| KR | 10-2014-0096894 | 8/2014 |
| KR | 10-2017-0052805 | 5/2017 |

\* cited by examiner

ELECTRONIC DEVICE AND METHOD OF DRIVING SAME

CROSS-REFERENCE TO RELATED APPLICATION

This application claims priority from and the benefit of Korean Patent Application No. 10-2015-0125020, filed on Sep. 3, 2015, which is hereby incorporated by reference for all purposes as if fully set forth herein.

BACKGROUND

Field

Exemplary embodiments relate to an electronic device and a method of driving the same. More particularly, exemplary embodiments relate to an electronic device including a touch panel and a method of driving the same.

Discussion of the Background

A variety of display devices for multi-media devices such as televisions, mobile phones, tablet computers, navigations, and game machines have been developed. The display devices include a keyboard or a mouse as an input device. In addition, recent display devices are provided with a touch panel as an input device.

Unlike existing flat display devices, a variety of forms of display devices have recently been developed. A variety of flexible display devices have been developed such as curved display devices, bending type display devices, foldable display devices, rollable display devices, and stretchable display devices.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an electronic device including a touch panel having a structure with reduced complexities.

Exemplary embodiments provide a method of driving an electronic device including a touch panel to sense a touch input using information on intensity of pressure applied to the touch panel.

Additional aspects will be set forth in the detailed description which follows, and, in part, will be apparent from the disclosure, or may be learned by practice of the inventive concept.

An exemplary embodiment discloses an electronic device that includes a display device including a display panel, a touch panel, and a touch sensing circuit configured to sense a touch input. The electronic device also includes an input pen configured to provide, to the touch sensing circuit, information on intensity of pressure applied to the display device. The touch panel includes touch pressure sensors and signal lines connected to the touch pressure sensors. Each touch pressure sensor has an area per unit length that increases along an extended direction of each touch pressure sensor. Each touch pressure sensor has a resistance that varies with an intensity of pressure and an area of pressure applied to the touch pressure sensors.

An exemplary embodiment also discloses a method of driving an electronic device. The method includes generating a touch input on a display device by an input pen, transmitting a wireless signal comprising information on a pressure intensity applied to the display device from the input pen, measuring resistance change values of touch pressure sensors having a resistance that varies with the pressure intensity and a pressure area applied to each of the touch pressure sensors, and calculating a coordinate of the touch input based on resistance change values of the touch pressure sensors and the information on pressure intensity from the wireless signal.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept and, together with the description, serve to explain principles of the inventive concept.

DETAILED DESCRIPTION OF THE ILLUSTRATED EMBODIMENTS

Figure 1A:
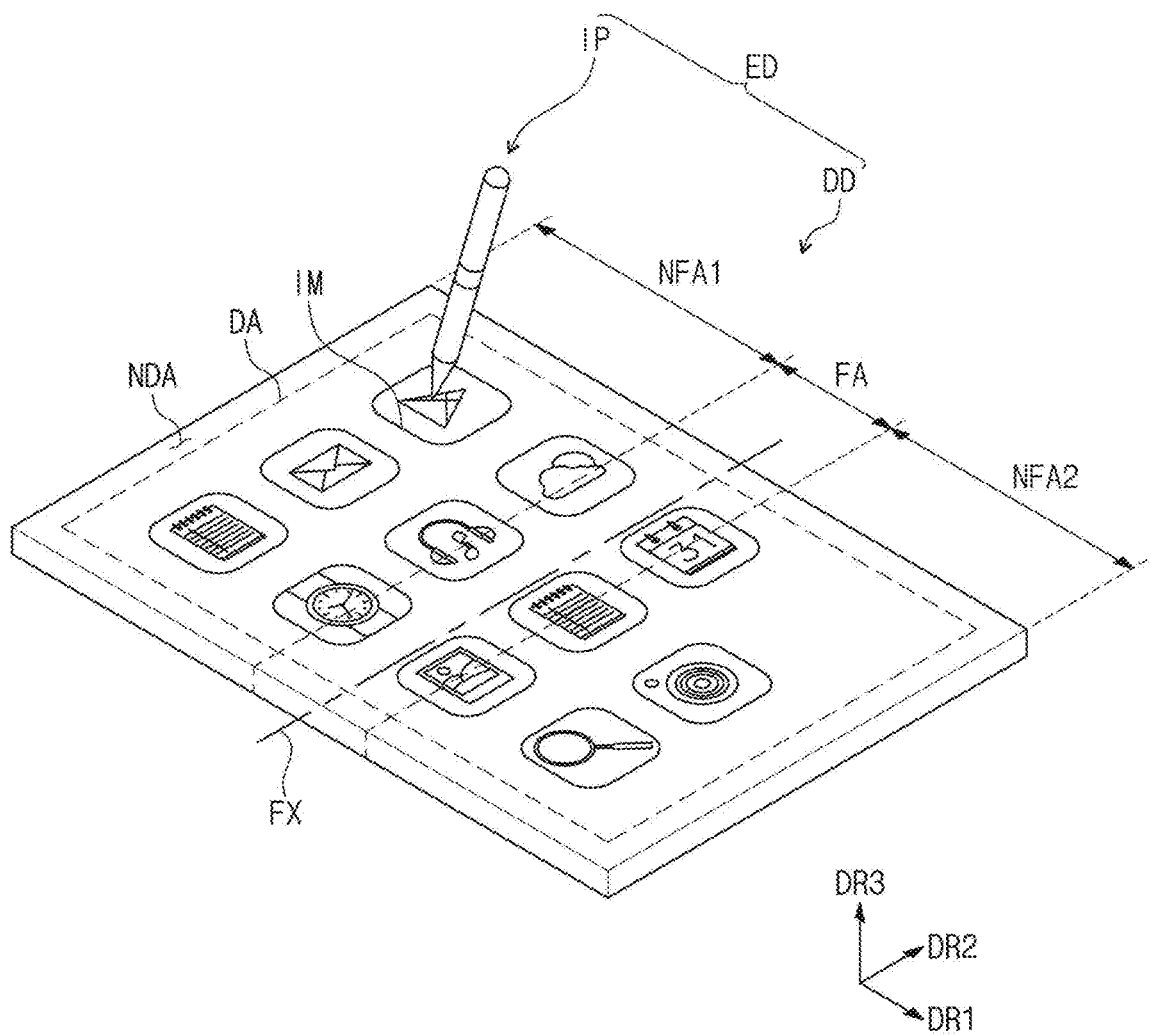
FIGS. 1A and 1B illustrate perspective views of an electronic device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, an electronic device will be described with reference to drawings according to an embodiment of the present invention.

Figure 1B:
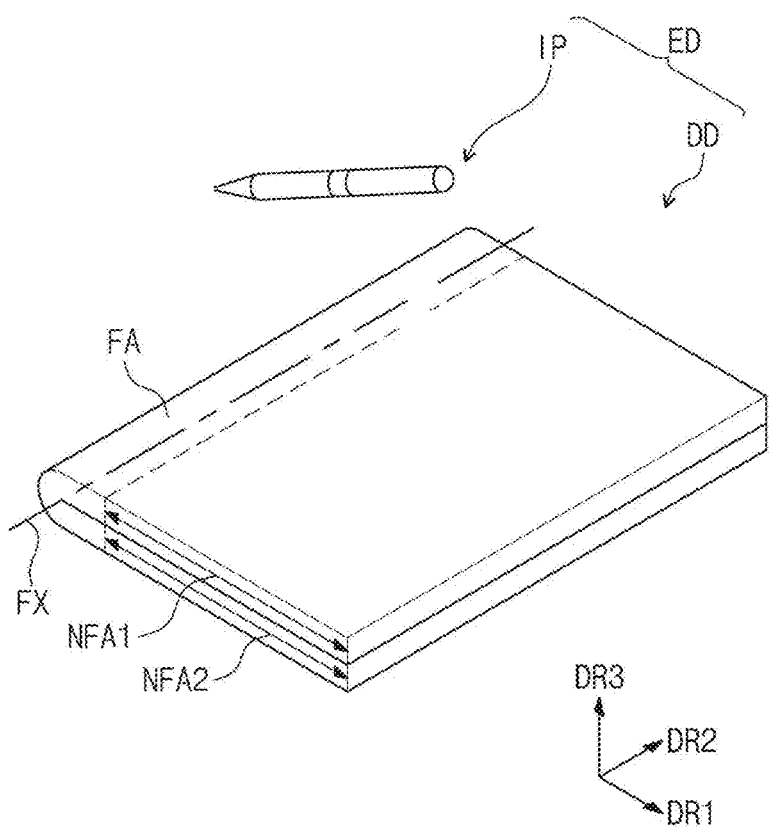

FIGS. 1A and 1B illustrate perspective views of an electronic device ED according to an exemplary embodiment. An electronic device ED may include a foldable display device DD and an input pen IP. The foldable display device DD may be illustrated as an example of the flexible display device DD. However, in an alternate exemplary embodiment, a variety of display devices DD such as a curved display device, a bending type display device, a foldable display device, a rollable display device, and a stretchable display device may be used.

In an exemplary embodiment, the display device is not limited to a flexible display device and may be a flat panel display device. Although not separately illustrated, the electronic device ED may be used for a small and medium-sized electronic device such as a mobile phone, a personal computer, a notebook computer, a personal digital assistant, a car navigation unit, a game machine, a portable electronic device, a wrist watch type electronic device, a camera as well as a large electronic device such as a television.

As illustrated in FIGS. 1A and 1B, a display surface displaying an image IM may be parallel to a surface defined by a first directional axis DR1 and a second directional axis DR2. A third directional axis DR3 indicates a direction normal to the display surface. The third directional axis DR3 indicates a thickness direction of the flexible display device DD. Front surfaces and rear surfaces of respective members may be divided by the third directional axis DR3. However, the directions indicated by the directional axes DR1, DR2, and DR3 are relative concepts, and thus may be converted into other directions.

As illustrated in FIGS. 1A and 1B, the display device DD may include a plurality of regions divided on a display surface. The display device DD may be divided into a display region DA and a non-display region NDA according to whether an image IM is displayed or not. The display region DA is a region where an image is displayed, and the non-display region NDA may be a region which is adjacent to the display region DA and where an image is not displayed. The display region DA may have a rectangular shape. The non-display region NDA may surround the display region DA. FIG. 1A illustrates a plurality of icon images IM as an example.

As illustrated in FIGS. 1A and 1B, the display device DD may be divided according to operation into a foldable region FA foldable along a folding axis FX. In particular, the display device DD may be divided into a first non-foldable region NFA1 and a second non-foldable region NFA2 which are not foldable. The display device DD may be inwardly folded so that the first and second non-folding regions NFA1 and NFA2 face each other. The display device DD may be outwardly folded so that the first and second non-folding regions NFA1 and NFA2 of the display area DA are exposed to the outside. Alternatively, the display device DD may be inwardly folded so that the first and second non-folding regions NFA1 and NFA2 of the display area DA are not exposed to the outside. In other words, when inwardly folded, the display area DA of NFA1 and NFA2 are folded over one another such that the display area DA of NFA1 and NFA2 contact each other or have air spaced between the display area DA of NFA1 and NFA2.

As illustrated in FIG. 1A, the input pen IP may touch any one of a plurality of icon images IM displayed when the display device DD is unfolded. In an exemplary embodiment, entering into predetermined information by using the input pen IP is referred to as a "touch input."

The intensity of pressure applied to the display device DD upon a "touch input" may be adjusted by a user. The input pen IP may provide, to the display device DD, information on the intensity of pressure applied to a display device DD. The information on the intensity of pressure applied to the display device DD may be used to calculate coordinate information on the touch input. Details regarding the intensity of pressure will be described below.

As illustrated in FIG. 1B, the input pen IP may operate in a ready state when the display device DD is inwardly folded. The input pen IP may also be temporarily deactivated.

Figure 2A:
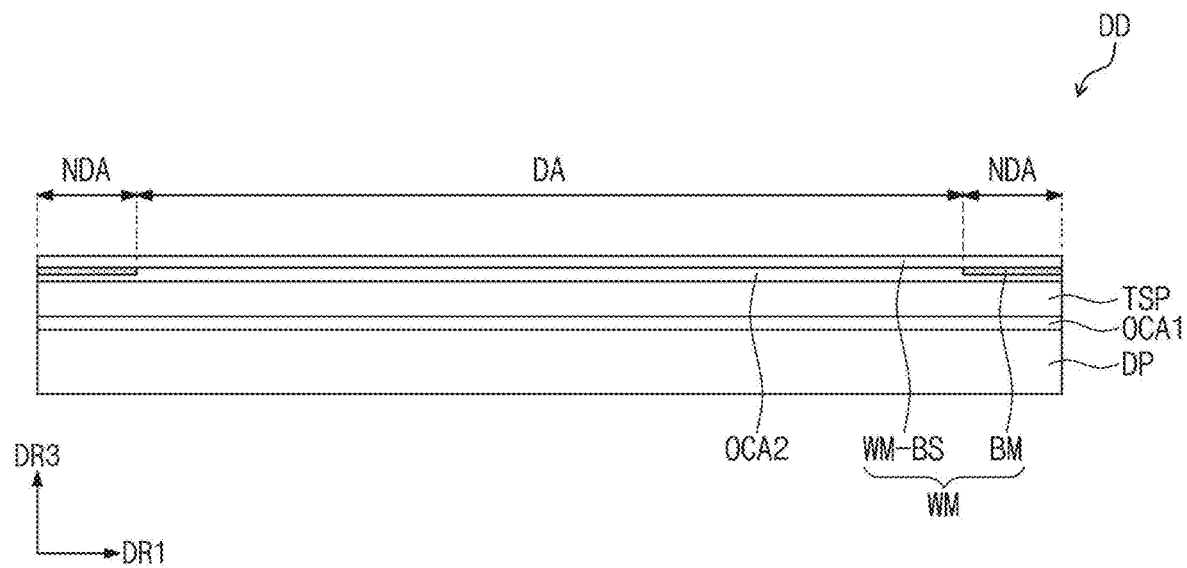
FIGS. 2A and 2B illustrate enlarged cross-sectional views of a display device according to an exemplary embodiment.
Figure 2B:
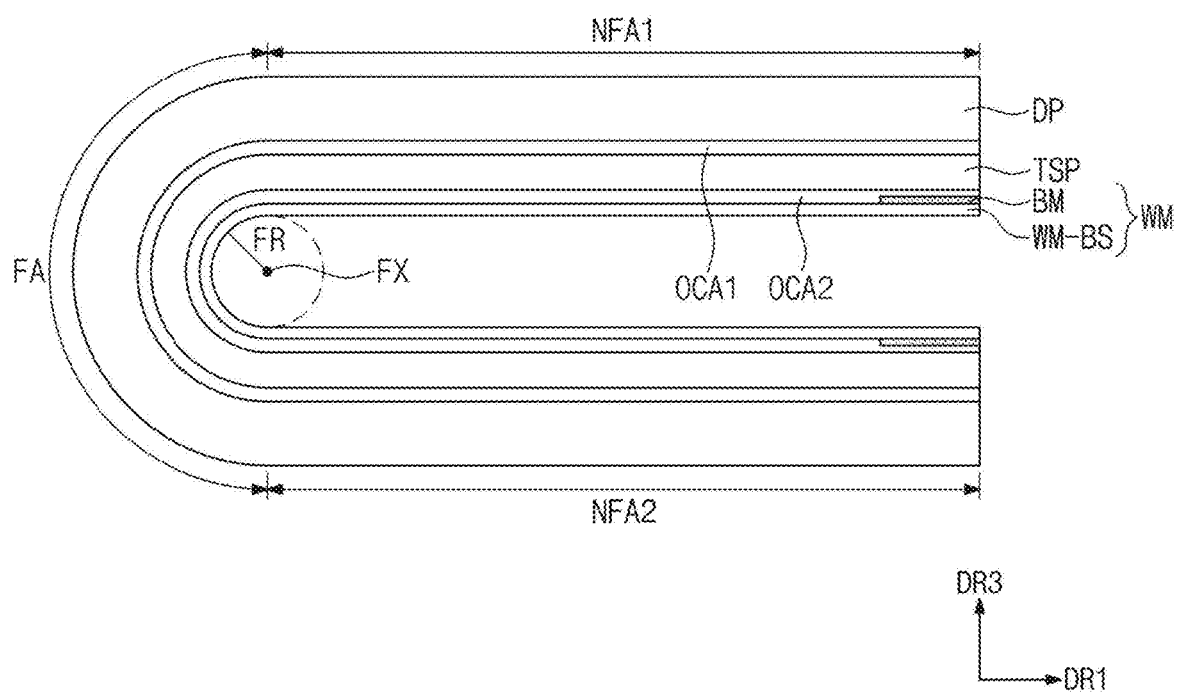

FIGS. 2A and 2B illustrate enlarged cross-sectional views of a display device DD according to an exemplary embodiment. FIGS. 2A and 2B do not illustrate a driving circuit driving a display panel DP and a driving circuit driving a touch panel TSP.

As illustrated in FIGS. 2A and 2B, the display device DD may include a display panel DP, a touch panel TSP, and a window member WM. Although not separately illustrated, the display device DD may further include a protective member coupled to the window member WM to protect the display panel DP and the touch panel TSP. Each of the display panel DP, the touch panel TSP, and the window member WM may be flexible.

The display panel DP may generate an image IM (see FIG. 1A) corresponding to input image data. The display panel DP may be a liquid crystal display panel, an organic light emitting display panel, an electrophoretic display panel, an electrowetting display panel, or the like. However, the type of the display panel DP is not limited to these examples and may be any suitable display panel. For clarity and brevity, but by no means limiting, exemplary embodiments are described as having an organic light emitting display panel as the display panel. Details about the organic light emitting display panel will be described below.

The touch panel TSP may obtain coordinate information on an input point. The touch panel TSP may be disposed on a front surface of the display panel DP. However, the positional relationship between the display panel DP and the touch panel TSP is not limited to this arrangement. Details about the touch panel TSP will be described below.

The window member WM may include a base member WM-BS and a black matrix BM. The black matrix BM may be disposed on a rear surface of the base member WM-BS to define a bezel region, i.e., the non-display region NDA (see FIG. 1A) of the display device DD. The base member WM-BS may include a glass substrate, a sapphire substrate, a plastic film, and the like. The black matrix BM is a colored organic layer and may be formed by a coating process. Although not separately illustrated, the window member WM may further include a functional coating layer disposed on the front surface of the base member WM-BS. The functional coating layer may include an anti-fingerprint layer, an anti-reflection layer, and a hard coating layer.

The display panel DP and the touch panel TSP may be coupled to each other by an optically clear adhesive film OCA1. The touch panel TSP and the window member WM may also be coupled to each other by an optically clear adhesive film OCA2. In an exemplary embodiment, any one of the two optically clear adhesive films OCA1 and OCA2 are omitted. For example, since the display panel DP and the touch panel TSP are manufactured in a continuous process, the touch panel TSP may be disposed directly on the display panel DP.

Figure 3:
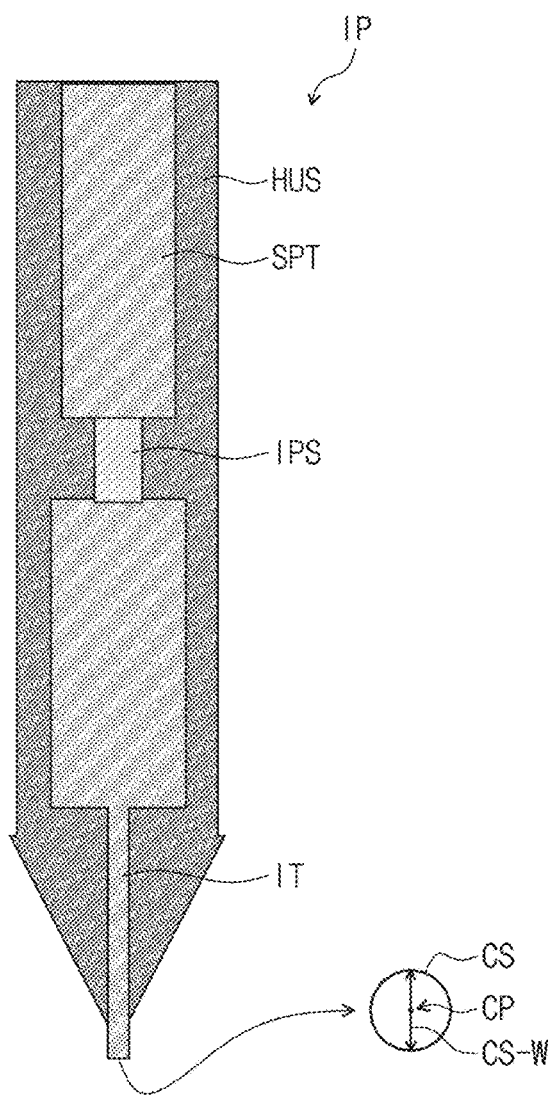
FIG. 3 illustrates a cross-sectional view of a touch panel according to an exemplary embodiment.

FIG. 3 illustrates a cross-sectional view of an input pen IP according to an embodiment of the present inventive concept. FIG. 3 does not illustrate a driving circuit driving the input pen IP.

The input pen IP may include an input tip IT, an input pressure sensor IPS, a supporter SPT, and a housing HUS. The housing HUS may accommodate the input tip IT, the input pressure sensor IPS, the supporter SPT, and a driving circuit IP-DC of the input pen IP (see FIG. 4).

When the input pen IP is in contact with a front surface of the window member WM (see FIG. 2A), the input tip IT may apply a predetermined pressure to the input pressure sensor IPS. As illustrated in FIG. 3, a contact surface CS of the input tip IT may have a circular shape. A maximum width CS-W passing through a center CP of the contact surface CS may be defined.

A pressure applied to the input pressure sensor IPS may be the same as a pressure applied to the window member WM (see FIG. 2A). Put another way, pressure to the display device DD by the input pen IP may be the same as pressure to the input pressure sensor IPS. The supporter SPT may support the input pressure sensor IPS so that the input pressure sensor IPS is not moved by an external pressure.

The input pressure sensor IPS may include a material having a resistance that varies with the applied pressure. The input pressure sensor IPS may include, for example, piezoelectric materials, carbon powders, quantum tunneling composites QTC, silver nano-particles, single crystal or polycrystalline silicon, carbon nanotubes, graphene, and the like.

Figure 4:
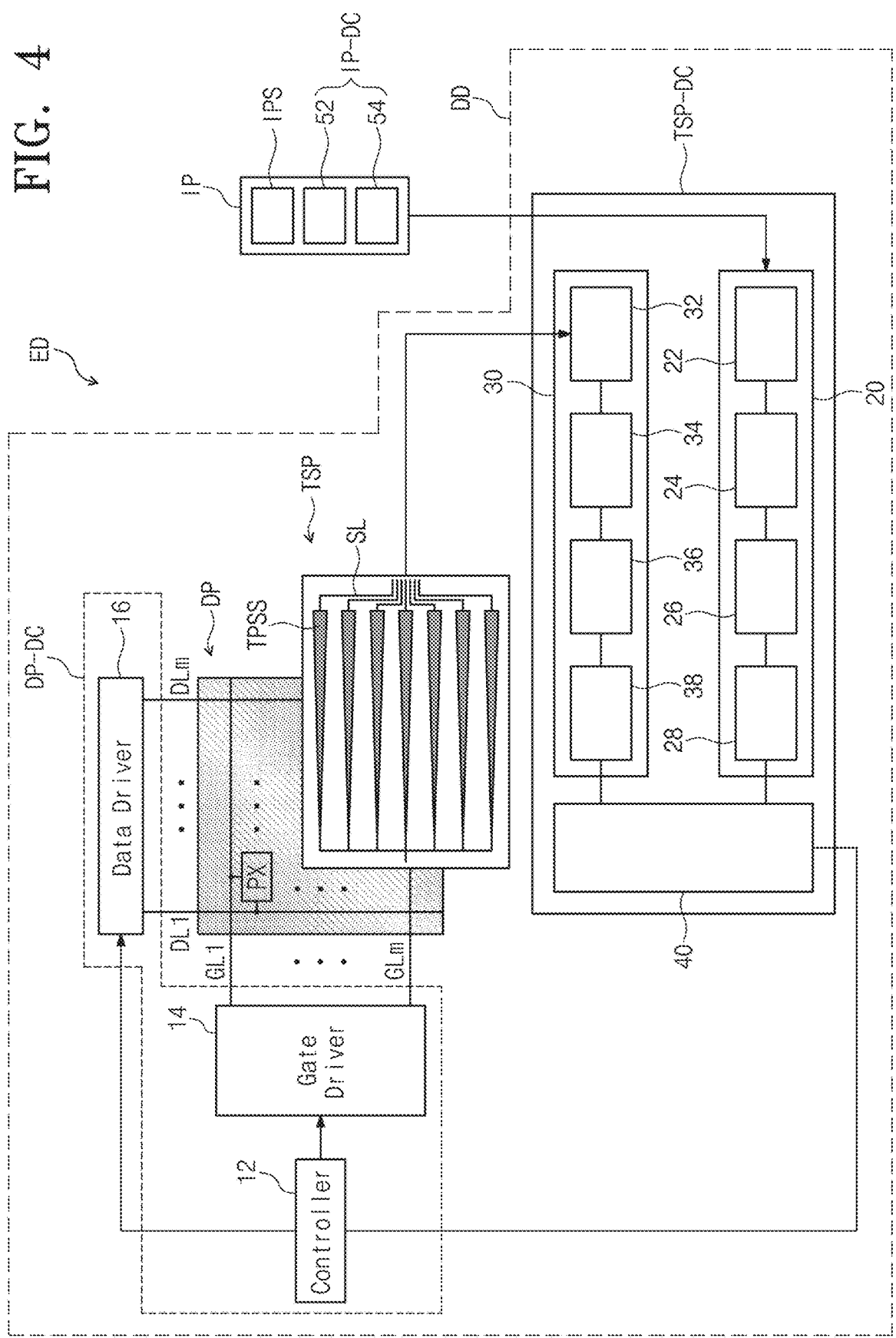
FIG. 4 illustrates a block diagram of an electronic device according to an exemplary embodiment.

FIG. 4 illustrates a block diagram of an electronic device ED according to an embodiment of the inventive concept. The electronic device ED may include a driving circuit DP-DC driving the display panel DP (hereinafter, display panel driving circuit), a driving circuit TSP-DC driving the touch panel TSP (hereinafter, touch sensing circuit), and a drive circuit IP-DC driving the input pen IP (hereinafter, input pen drive circuit).

The display panel DP may include a plurality of gate lines GL1 to GLn, a plurality of data lines DL1 to DLm, and a plurality of pixels PX. The display panel driving circuit DP-DC may include a controller 12, a gate driver 14, and a data driver 16. The controller 12 may receive input image signals, and the input image signals may be converted into image data corresponding to an operation mode of the display panel DP. The controller 12 may receive various types of control signals, such as a vertical synchronization signal, a horizontal synchronization signal, a main clock signal, and a data enable signal, and may output a gate control signal and a data control signal.

The controller 12 may control the display panel DP so that information corresponding to the touch input is displayed.

The controller 12 may receive coordinate information from the touch panel driving circuit TSP-DC and may control the gate driver 14 and the data driver 16 so that information indicated by an icon corresponding to the coordinate is displayed. The gate driver 14 may output gate signals to a plurality of gate lines GL1 to GLm. The data driver 16 may output data signals to a plurality of data lines DL1 to DLm. Although not separately illustrated, the display panel driving circuit DP-DC may further include a power supply voltage-providing circuit providing a power supply voltage required for operations of the display panel DP, the controller 12, the gate driver 14, and the data driver 16.

The touch panel TSP may include touch pressure sensors TPSS (hereinafter, sensors TPSS or sensor TPSS) and signal lines SL connected to the sensors TPSS. The sensors TPSS may include materials having a resistance that varies with the intensity and area of pressure applied thereto. The sensors TPSS may include, for example, piezo-electric materials, carbon powders, quantum tunneling composites QTC, silver nano-particles, single crystal or polycrystalline silicon, carbon nanotubes, graphene, and the like.

The signal lines SL may include a highly conductive material, for example, gold, silver, copper, aluminum, and alloys thereof. The signal lines SL may have a single-layer structure or a multi-layer structure which include the above described material.

The touch sensing circuit TSP-DC may include the receiving unit 20 configured to receive a wireless signal from the input pen IP, the current sensing unit 30 configured to sense a resistance change value of the sensors TPSS, and the calculating unit 40 configured to calculate a coordinate of a touch input based on the information on the resistance change value of the sensors TPSS and the intensity of pressure. Although not separately illustrated, the touch sensor TSP-DC may further include a driving voltage-providing circuit configured to provide a predetermined level of driving voltage to the sensors TPSS.

The receiving unit 20 may include an amplifier 22 configured to amplify a received wireless signal, a noise reduction filter 24 configured to remove noise of an amplified signal, an analog-to-digital converter 26 configured to convert a noise-removed analog signal into a digital signal, and a digital signal processor 28 configured to calculate information on intensity of pressure applied to the display device DD by the input pen IP from a converted digital signal.

The current sensing unit 30 may include a read-out circuit 32 configured to read the current values of each of the sensors TPSS from the signal lines SL, a multiplexer 34 configured to sequentially output current values received from the read-out circuit 32 in order to correspond to an unique code of the sensors TPSS, an analogue-digital converter 36 configured to convert analogue signals received from the multiplexer 34 into digital signals, and a digital signal processor 38 configured to calculate information on a resistance change value of each of the sensors TPSS from the converted digital signals.

The calculating unit 40 may calculate coordinate information on the touch input based on information on the intensity of pressure applied to a display device DD and the resistance change values of each of the sensors TPSS. The calculating unit 40 may read coordinate information corresponding to the intensity of pressure and the resistance change values of the sensors TPSS from a look-up table stored in a memory. The calculating unit 40 may provide coordinate information on the touch input to the controller 12.

The input pen-driving circuit IP-DC may include a signal generating circuit 52 generating a wireless signal based on a signal received from the input pressure sensor IPS, and a transmitter 54 configured to transmit a wireless signal. Although not separately illustrated, the input-pen driving circuit IP-DC may further include a driving voltage-providing circuit configured to provide a predetermined level of driving voltage to the input pressure sensor IPS.

The signal generating circuit 52 may generate a wireless signal including information on the intensity of pressure applied to the display device DD by the input pen IP based on a current value received from the input pressure sensor IPS. Although not shown, the signal generating circuit 52 may include a digital signal processor.

The transmitter 54 may output a wireless signal. The transmitter 54 may include a wireless communication transmitting circuit of any suitable technology. For example, the wireless communication transmitting circuit may include a wireless local area network (WLAN) transmitting circuit, a wireless personal area network (WPAN) transmitting circuit, and/or near field communication (NFC) transmitting circuit. The WLAN transmitting circuit may include a WiFi transmitting circuit. The WPAN transmitting circuit may include a Bluetooth® transmitting circuit, and/or a ZigBee® transmitting circuit. Further, the wireless communication transmitting circuit may include a beacon transmitting circuit. The receiving unit 20 of the touch sensing circuit TSP-DC may be selected as a receiving circuit in conjunction with the transmitter 54 of the input pen driving circuit IP-DC.

Figure 5:
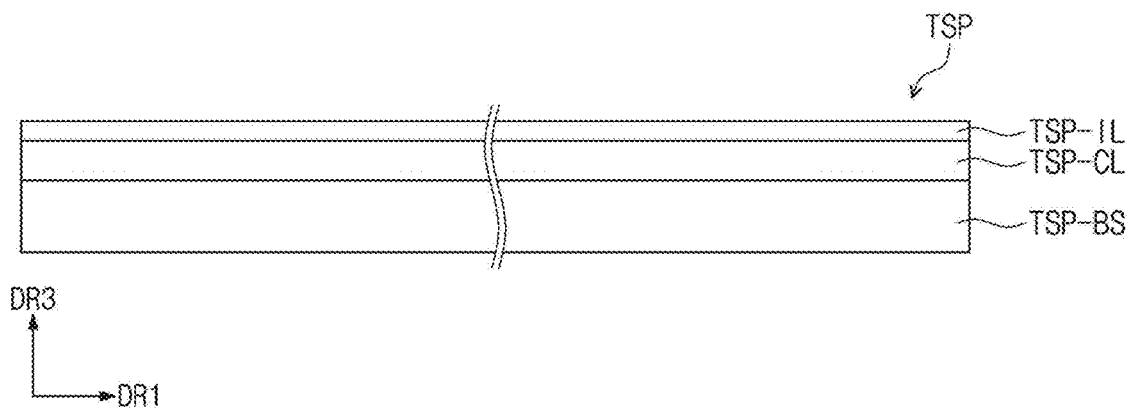
FIG. 5 illustrates a cross-sectional view of a touch panel according to an exemplary embodiment.
Figure 6:
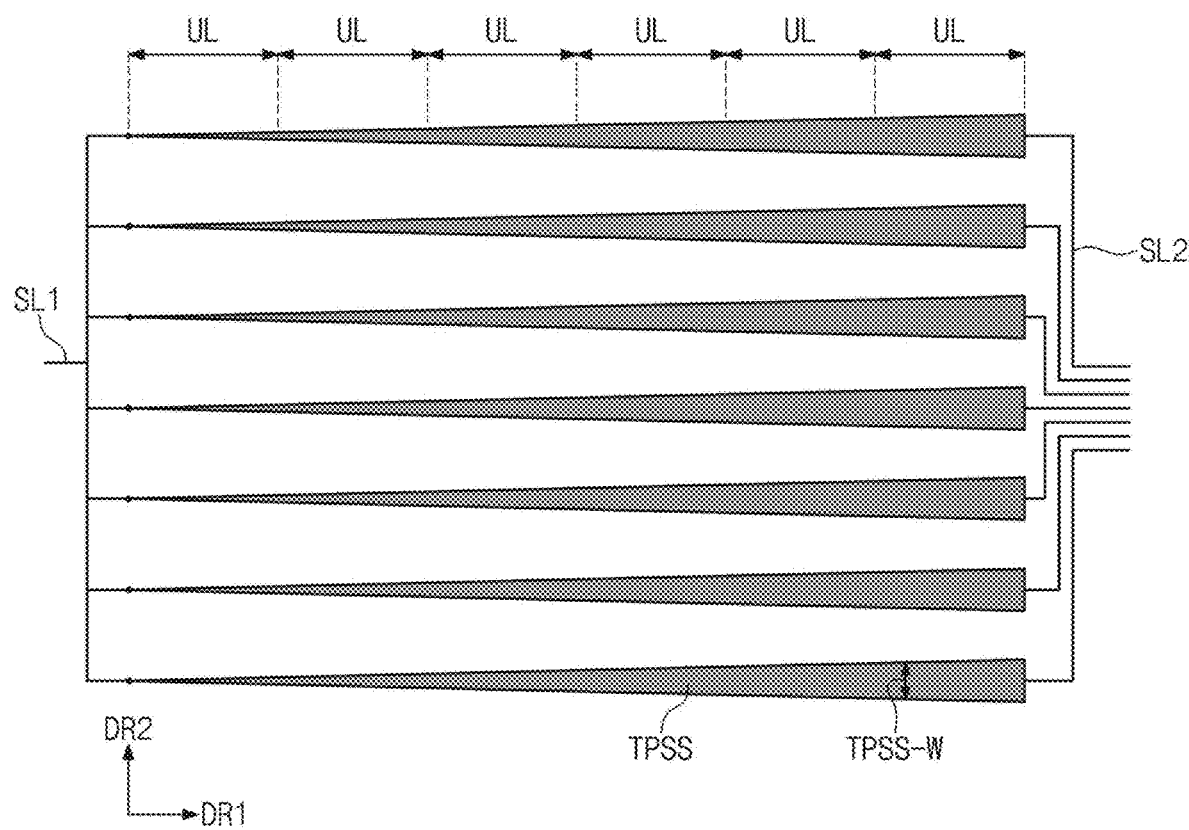
FIG. 6 illustrates a plan view of a touch panel according to an exemplary embodiment.

FIG. 5 illustrates a cross-sectional view of a touch panel TSP according to an exemplary embodiment. FIG. 6 illustrates a plan view of a touch panel TSP according to an exemplary embodiment. FIGS. 7A, 7B, 7C, and 7D illustrate plan views of sensors TPSS1, TPSS2, and TPSS3 according to an exemplary embodiment. Hereinafter, a touch panel TSP will be described in more detail with reference to the accompanying FIGS. 5, 6, 7A, 7B, 7C, and 7D.

Referring to FIG. 5, the touch panel TSP may include a base member TSP-BS, a conductive layer TSP-CL, and an insulating layer TSP-IL. In an exemplary embodiment, a buffer layer is disposed on the base member TSP-BS and the conductive layer TSP-CL. In an alternate exemplary embodiment, the base member TSP-BS is omitted. The base member TSP-BS may include at least one of polyimide (PI), polyethyleneterephthalate (PET), polyethylenenaphthalate (PEN), polyethersulphone (PES), and fiber reinforced plastics (FRP).

The conductive layer TSP-CL may include materials having a resistance that varies corresponding to pressure constituting the sensors TPSS (see FIG. 4). The conductive layer TSP-CL may include a highly conductive material, such as gold, silver, copper, aluminum, and alloys thereof. The conductive layer TSP-CL may be patterned into the sensors TPSS and the signal lines SL through a photolithography process.

The insulating layer TSP-IL may protect the sensors TPSS and the signal lines SL or may insulate some conductive patterns from other conductive patterns. The insulating layer TSP-IL may include at least one of an inorganic film and an organic film. For example, the TSP-IL may have a single layer structure that includes only an inorganic film or only an organic film. As another example, the insulating layer TSP-IL may have a multi-layer structure that includes more than one inorganic film and an organic film. As another example, the insulating layer TSP-IL may have a multi-layer structure that includes an inorganic film and more than one organic film. As a further example, the insulating layer TSP-IL may have a multi-layer structure that includes more than one inorganic film and more than one organic film.

FIG. 6 exemplarily illustrates seven sensors TPSS. The number of the sensors TPSS is not limited thereto, and in another embodiment, the number may be modified.

Each of the sensors TPSS may extend in a first direction DR1, and the sensors TPSS may be arranged in a second direction DR2 crossing the first direction DR1. The sensors TPSS may have the same shape and may be spaced apart from each other at the same distance.

Each of the sensors TPSS may have a shape in which an area per unit length UL increases along the extended direction. Each of the sensors TPSS may have a shape in which a width of the sensors TPSS linearly increases along the extended direction (e.g. the width of the sensors are the largest at one end in the first direction DR1 and the smallest at the opposite end in the first direction DR1). FIG. 6 exemplarily illustrates the sensors TPSS that extend in the first direction DR1 and have a triangular shape.

The signal line SL (see FIG. 4) may include a first signal line SL1 and second signal lines SL2. The first signal line SL1 may be commonly connected to first end of the sensors TPSS and may receive a driving voltage. The second signal lines SL2 may be connected to second ends of the sensors TPSS, opposite the first ends of the sensors, respectively.

The first signal line SL1 may provide the same level of voltage to each of the sensors TPSS. In an exemplary embodiment, a plurality of first signal lines, instead of a single first signal line SL1, are connected to the first ends of the sensors TPSS, respectively. The current sensing unit 30 (see FIG. 4) may measure current values flowing from the second signal lines SL2 to the sensors TPSS to calculate a resistance change value of the sensors TPSS according to touch pressure.

FIGS. 7A, 7B, 7C, and 7D illustrate that the shape of sensors TPSS1, TPSS2, TPSS3, and TPSS4 may be modified.

Figure 7A:
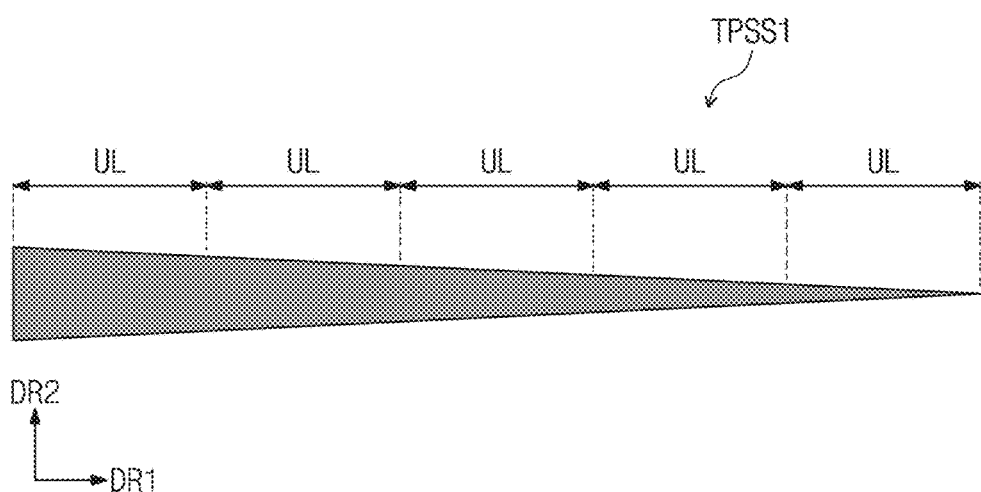
FIGS. 7A, 7B, 7C, and 7D illustrate plan views of sensors according to an exemplary embodiment.

As illustrated in FIG. 7A, the sensor TPSS1 may have a shape with left and right reversed compared with the sensor TPSS illustrated in FIG. 6.

Figure 7B:
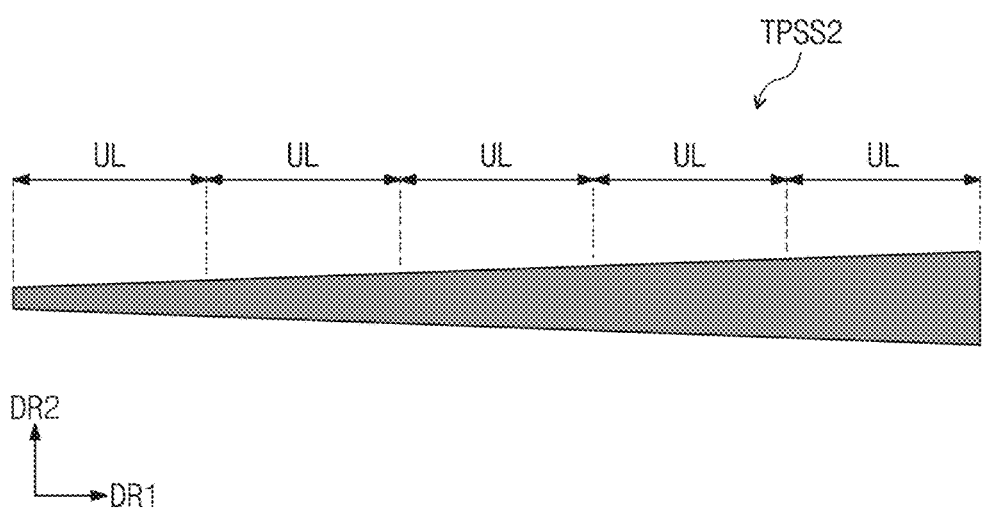

As illustrated in FIG. 7B, the sensor TPSS2 may have a trapezoidal shape extending along the first direction DR1.

Figure 7C:
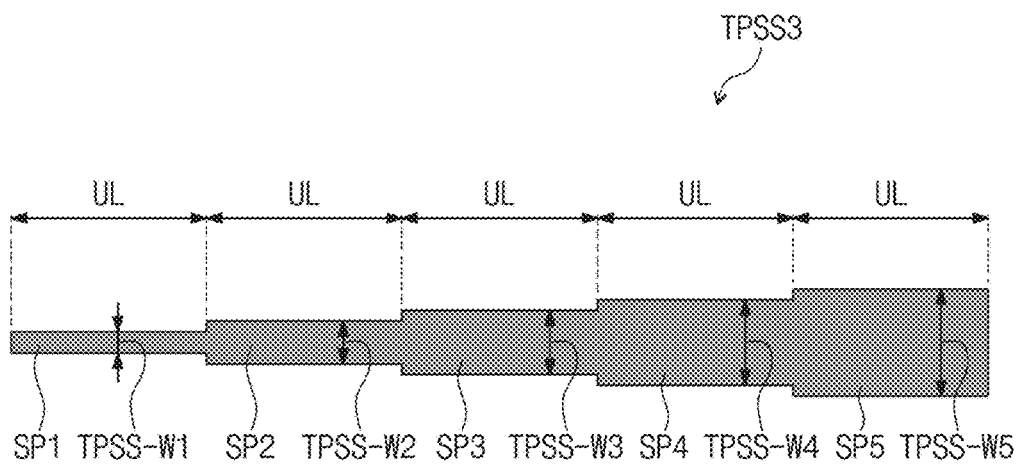

As illustrated in FIG. 7C, the sensor TPSS3 may include k number of sensor parts with different widths (where k is a natural number of 2 or more). Of the k number of sensor parts, an (n+1)th sensor part is wider than an n-th sensor part (where n is a natural number of 1 or more). Of the k number of sensor parts, a first sensor part has the smallest width and a k-th sensor part may have the greatest width. FIG. 7C exemplarily illustrates the sensor TPSS3 including five sensor parts SP1, SP2, SP3, SP4, and SP5. However, the number of sensor parts are not limited thereto.

Figure 7D:
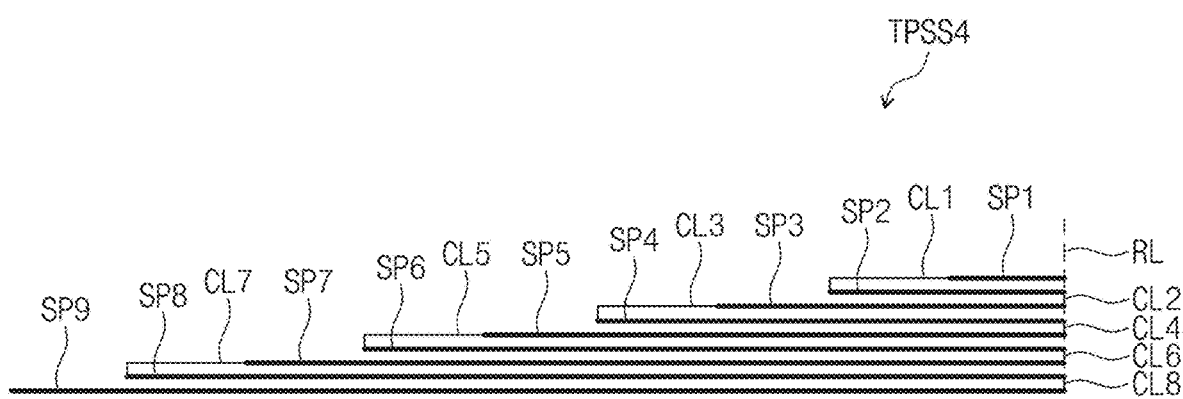

As illustrated in FIG. 7D, the sensor TPSS4 may include k number of sensor parts with different lengths (where k is a natural number of 2 or more). Each of the k number of sensor parts may include a pressure sensitive material. Of the k number of sensor parts, an (n+1)th sensor part is longer than an n-th sensor part (where n is a natural number of 1 or more). Of the k number of sensor parts, a first sensor part has the smallest length and a k-th sensor part may have the greatest length. The k number of sensor parts may be arranged in a direction (the second direction DR2 of FIG. 7D) crossing the longitudinal direction (the first direction DR1 of FIG. 7D). Each of the k number of sensor parts may be aligned on a reference line RL on one end. As illustrated in FIG. 7D, right ends may be aligned on the reference line RL. The sensor TPSS4 may include connection lines connecting sensor parts adjacent to each other, among the k number of sensor parts. The connection line may include a highly conductive material such as gold, silver, copper, aluminum, and an alloy thereof. FIG. 7D exemplarily illustrates the sensor TPSS4 including nine sensor parts SP1, SP2, SP3, SP4, SP5, SP6, SP7, SP8, and SP9 and eight connection lines CL1, CL2, CL3, CL4, CL5, CL6, CL7, and CL8. However, the numbers of sensor parts and connection lines are not limited thereto.

Although not separately illustrated, some of the sensors TPSS illustrated in FIG. 6 may be replaced by any one of sensors TPSS1, TPSS2, TPSS3, and TPSS4 which are illustrated in FIGS. 7A, 7B, 7C, and 7D. For example, even-numbered sensors TPSS may be replaced by any one of sensors TPSS1, TPSS2, TPSS3, and TPSS4 which are illustrated in FIGS. 7A, 7B, 7C and 7D. Exemplary embodiments are not limited to the sensors TPSS having the same shape.

Figure 8:
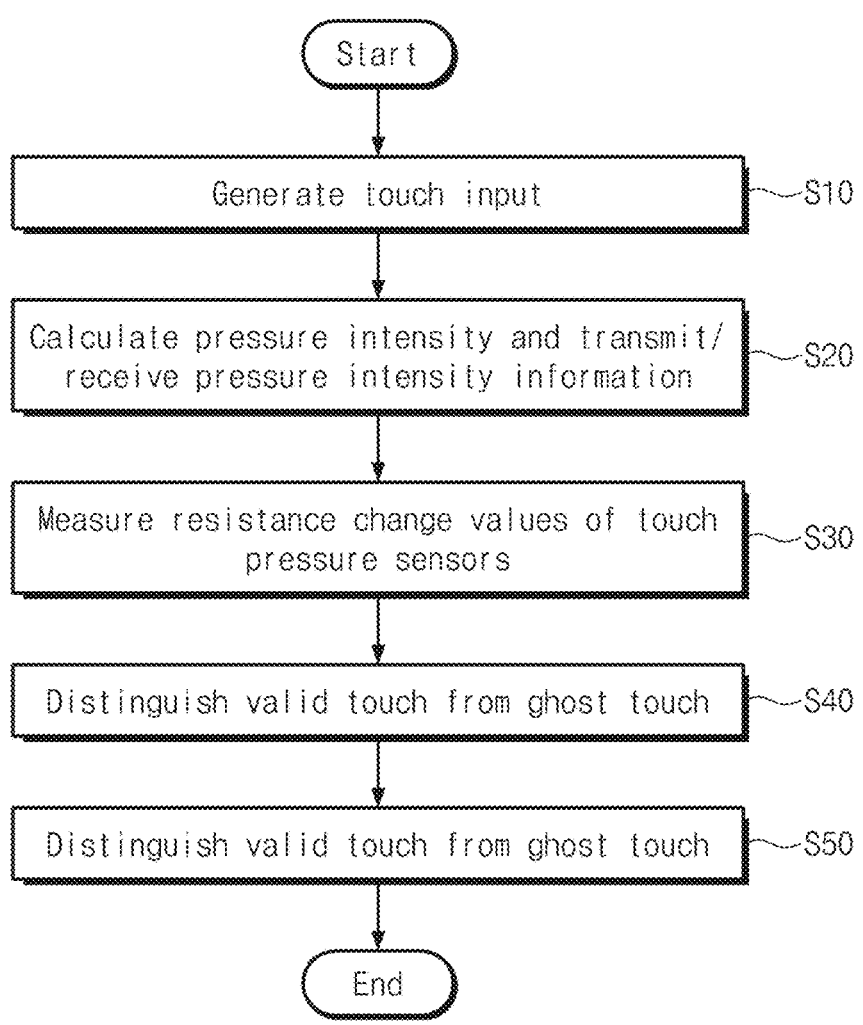
FIG. 8 illustrates a flow chart of a method of driving an electronic device according to an exemplary embodiment.
Figure 9A:
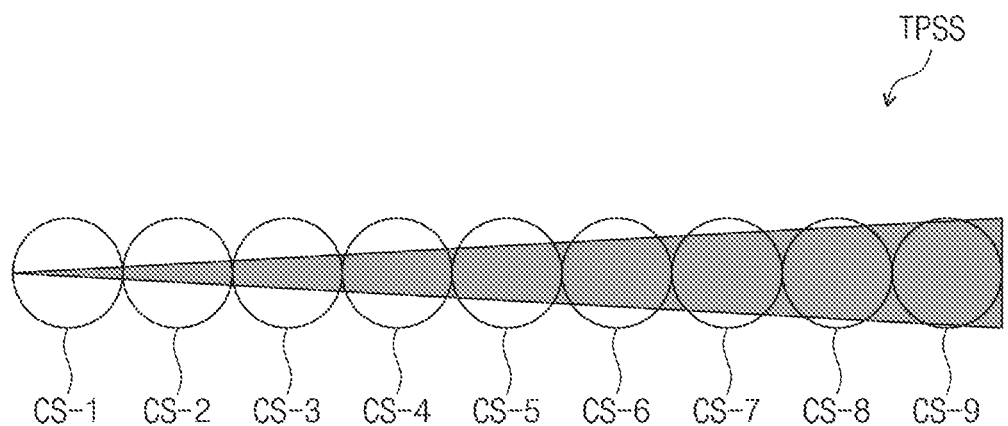
FIG. 9A illustrates touch inputs generated in sensors.
Figure 9B:
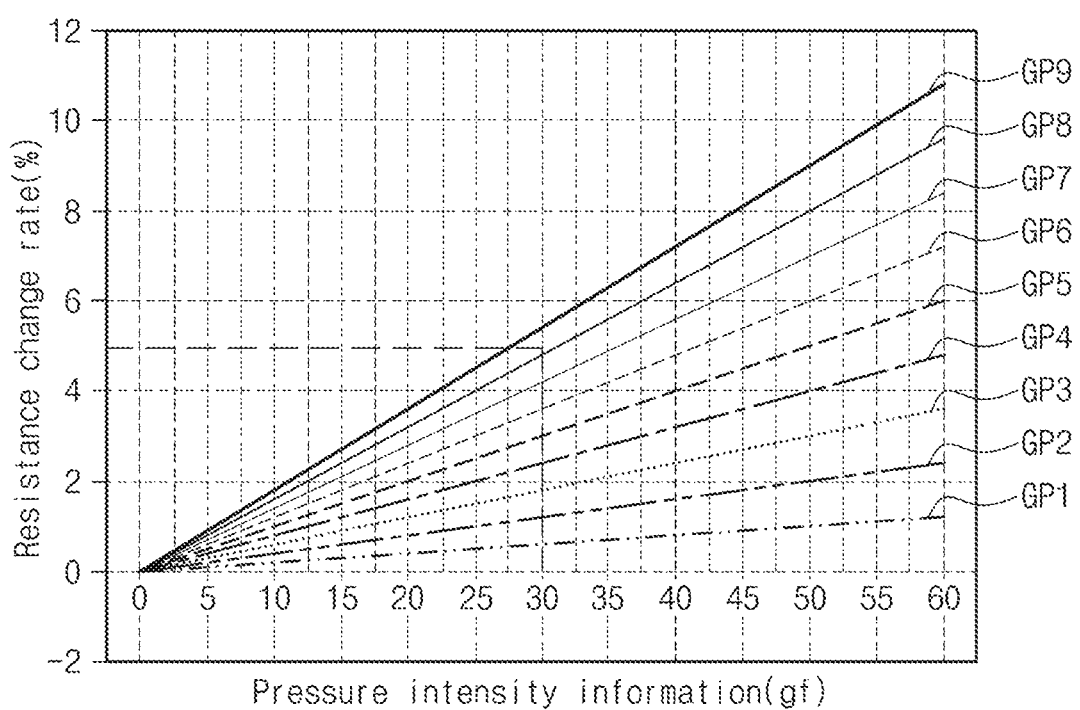
FIG. 9B is graphs showing a resistance change value according to intensity of pressure.
Figure 9C:
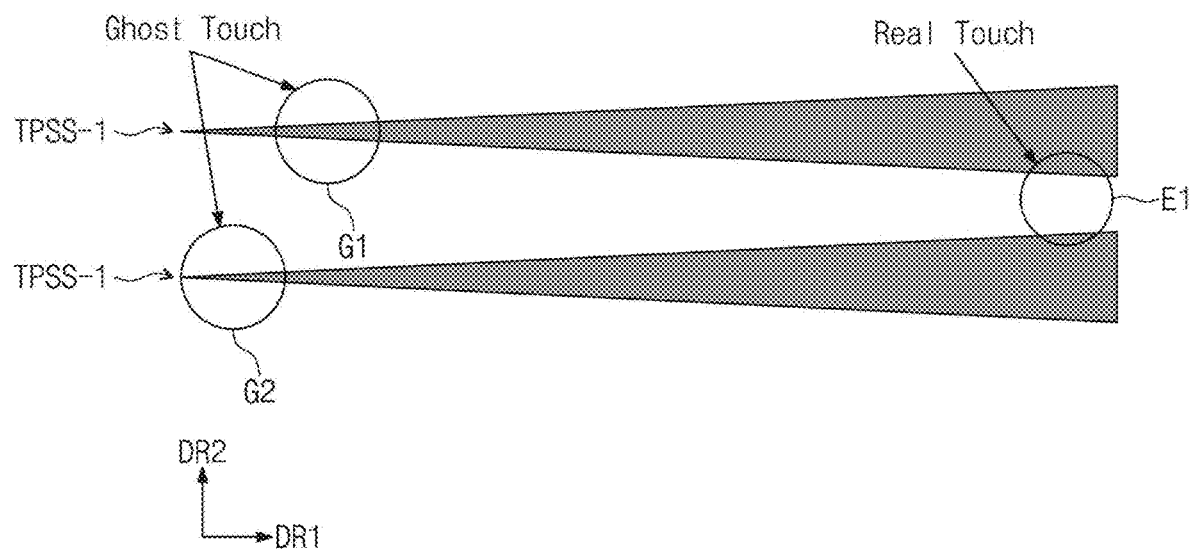
FIG. 9C illustrates a method of distinguishing a ghost touch input from a valid touch input.
Figure 9D:
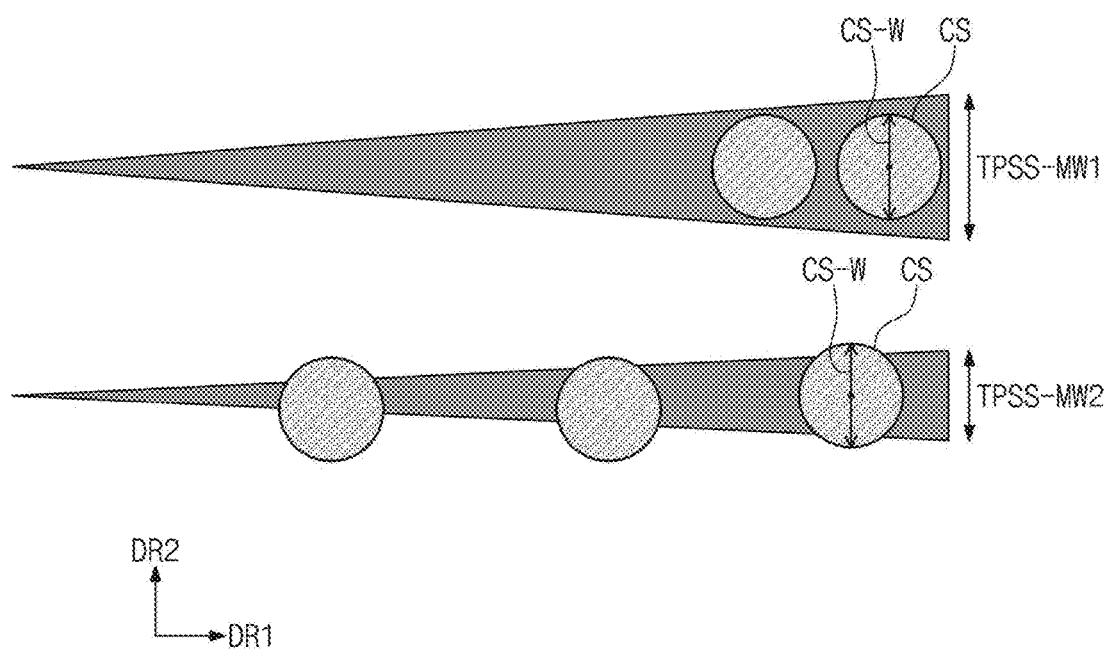
FIG. 9D illustrate a comparison between an input area of an input tip of an input pen and a width of a sensor.
Figure 9E:
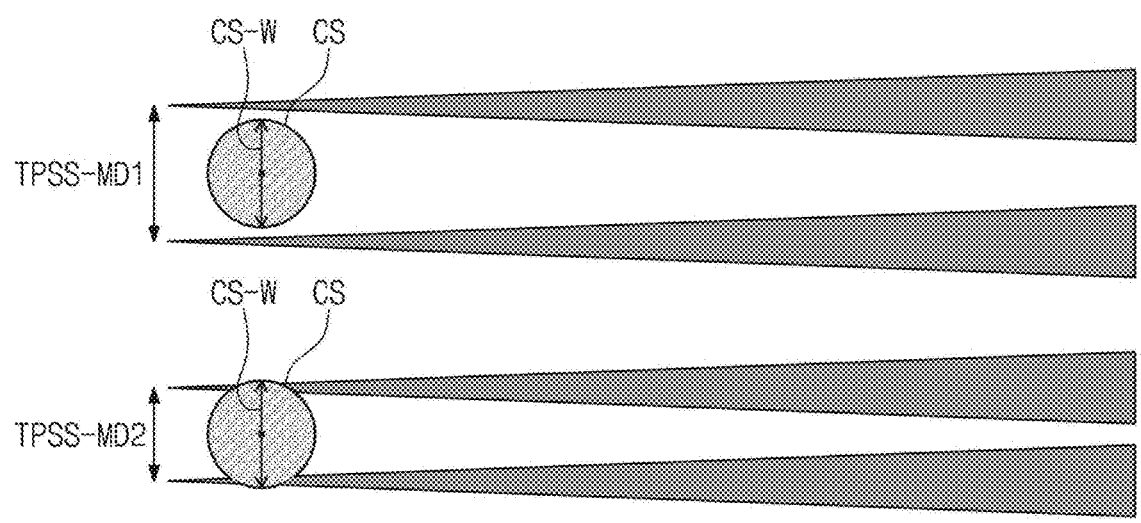
FIG. 9E illustrate a comparison between an input area of an input tip of an input pen and a separation distance between two adjacent sensors.

FIG. 8 illustrates a flow chart of a method of driving an electronic device according to an exemplary embodiment. FIG. 9A illustrates touch inputs generated in the sensors TPSS. FIG. 9B are graphs showing a resistance change value according to intensity of pressure. FIG. 9C illustrates a method for distinguishing a ghost touch input from a valid touch input. FIG. 9D illustrate a comparison between an input area of an input tip of an input pen and a width of the sensor TPSS. FIG. 9E illustrates a comparison between an input area of an input tip of an input pen and a separation distance between adjacent two sensors. Hereinafter, a method of driving an electronic device an exemplary embodiment will be described with reference to FIGS. 8, 9A, 9B, 9C, 9D, and 9E.

As illustrated in FIG. 8, a touch input may be generated (S10). The input pen IP (see FIGS. 1A and 1B) may pressurize the front surface of the window member WM (see FIG. 2A) with an intensity determined by the user (e.g., the use presses the input pen IP with high pressure, low pressure, or somewhere inbetween). Before the touch input is generated, the touch panel TSP may operate in a calibration mode so that the touch panel TSP is set to an optimal state for sensing a touch input.

When a touch input is generated, the intensity of the pressure applied to the display device DD (see FIGS. 1A and 1B) by the input pen IP may be calculated, and information on the intensity of the pressure between the input pen IP and the display device DD may be transmitted from the input pen IP to the display panel DD and received by the display panel DD (S20). FIG. 9A illustrates contact surfaces CS-1, CS-2, CS-3, CS-4, CS-5, CS-6, CS-7, CS-8, and CS-9 of virtual touch inputs that may be generated on the sensors TPSS. Each of the contact surfaces CS-1, CS-2, CS-3, CS-4, CS-5, CS-6, CS-7, CS-8, and CS-9 of the virtual touch inputs may correspond to the contact surface CS of the input tip IP described with reference to FIG. 3. Regardless of the position of the virtual touch inputs, only the intensity of pressure applied to the display device DD by the input pen IP may be calculated. The transmitter 54 (see FIG. 4) of the input pen IP may transmit a wireless signal including information on the intensity of pressure applied to the display device DD to the receiving unit 20 (see FIG. 4) of the touch panel TSP by using a WLAN (e.g., a WiFi signal), WPAN (e.g., Bluetooth® signal), and/or NFC.

The current sensing unit 30 (see FIG. 4) of the touch sensing circuit TSP-DC may measure a resistance change value of the sensors TPSS (S30) (see FIG. 6). The current sensing unit 30 (see FIG. 4) may measure current values flowing through the sensors TPSS and may convert the calculated current values into resistance change values. The current sensing unit 30 (see FIG. 4) may provide the measured resistance change values to the calculating unit 40 (see FIG. 4) of the touch sensing circuit TSP-DC. The resistance change value may be provided as an absolute value of a changed resistance or a resistance change rate (%). Hereinafter, a description is provided on the assumption that the resistance change value is provided as a resistance change rate (%) for the convenience of the reader.

The calculating unit 40 may calculate a coordinate of the touch input. FIG. 9B illustrates nine graphs GP1, GP2, GP3, GP4, GP5, GP6, GP7, GP8, and GP9. The nine graphs GP1 to GP9 show resistance change rates and resistance change values according to the intensity of pressure applied to the sensor TPSS through the contact surfaces of the nine virtual touch inputs CS-1 to CS-9 illustrated in FIG. 9A, respectively. At the same pressure, as an overlapping area between the contact surface CS of the input tip IT and the sensor TPSS increases, the resistance change rate increases. A relationship among the pressure intensity, the overlapping area, and the resistance change rate may be stored in a memory.

The calculating unit 40 may calculate coordinate information on the touch input in the second direction DR2 (see FIG. 6) from resistance change values of the sensors TPSS (see FIG. 6). The calculating unit 40 may determine that the touch input was generated on the sensor where the resistance varied.

The calculating unit 40 may determine the X-axis values in the graph of FIG. 9B according to the pressure intensity information received from the receiving unit 20. The calculating unit 40 may determine the Y-axis value in the graph of FIG. 9B according to the resistance change rate received from the current sensing unit 30. Among the nine virtual touch inputs, a touch input in which an actual touch input is generated may be determined from the X-axis value and the Y-axis value and the coordinate information of the touch input in the first direction DR1 (see FIG. 6) may be calculated.

A method of calculating a coordinate of the touch input by the calculating unit 40 will be described in detail. According to an exemplary embodiment, a valid touch input is distinguished from a ghost touch input, and then a coordinate of the valid touch input is calculated.

The calculating unit 40 may distinguish between the ghost touch input and the valid touch input by using pressure intensity information, resistance change rate, and information on the contact surface CS of the input tip IT (see FIG. 3) (S40). FIG. 9C illustrates a circumstance in which the resistance change is sensed by two adjacent sensors TPSS. The calculating unit 40 may assume touch inputs to be ghost touch inputs G1 and G2 by using the received pressure intensity information and the resistance change rate of the two sensors TPSS. Coordinate information on assumed ghost touch inputs G1 and G2 may be calculated as described with reference to FIGS. 9A and 9B.

The calculating unit 40 may calculate an overlapping area (hereinafter, first overlapping area) between the first ghost touch input G1 and the sensor TPSS and an overlapping area (hereinafter, second overlapping area) between the second ghost touch input G2 and the sensor TPSS. For example, the first overlapping area is the same as an overlapping area between the contact surface CS of the input tip IT and the sensor TPSS when the first ghost touch input G1 is assumed to be a valid touch input. An overlapping area corresponding to the ghost touch input may be stored in memory as a look-up table.

The calculating unit 40 may determine that an input in which the first and second overlapping areas may be generated on the two sensors TPSS by one touch is a valid touch input E1. At this time, the valid touch input E1 may be determined by using information obtained from the contact surface CS of the input tip IT. For example, the valid touch input E1 may be determined by using the area of the contact surface CS and/or a maximum width CS-W of the contact surface (see, FIG. 3).

When the valid touch input E1 is determined, the calculating unit 40 may calculate the coordinate information of the valid touch input E1. The coordinate information on inputs in which the contact surface CS of the input tip IT may overlap two sensors TPSS at the same time by one touch may be stored in memory as a look-up table. The calculating unit 40 may read the coordinate information on the valid touch input E1 from the memory.

In order to improve accuracy and precision of touch input sensing, the contact surface CS of the input tip IT preferably satisfies the following condition with respect to the sensors TPSS. FIG. 9D illustrates two types of sensors and FIG. 9E illustrates an arrangement of the two types of sensors.

Maximum widths TPSS-MW1 and TPSS-MW2 of sensors respectively disposed at an upper portion and a lower portion of FIG. 9D are different from each other. Two touch inputs generated in the sensor disposed at the upper portion are not distinguished from each other. In order to improve accuracy and precision of the touch input sensing in the first direction DR1, a maximum width of a sensor in the second direction DR2 may be less than the maximum width CS-W passing through a center CP of the contact surface CS. In other words, exemplary embodiments may use touch sensors with a maximum width TPSS-MW in the second direction DR2 that is less than the maximum width CS-W of the contact surface (e.g., TPSS-MW2) instead of a maximum width TPSS-MW in the second direction DR2 that is equal to or more than the maximum width CS-W of the contact surface (e.g., TPSS-MW1).

A maximum separation distance TPSS-MD1 between two sensors disposed at an upper portion of FIG. 9E and a maximum separation distance TPSS-MD2 between two sensors disposed at a lower portion of FIG. 9E may be different from each other. Two touch inputs generated between two sensors disposed at the upper portion may not be sensed. In order to improve accuracy and precision of the touch input sensing in the second direction DR2, the maximum separation distance between two adjacent sensors may be less than the maximum width CS-W passing through a center CP of the contact surface CS. In other words, exemplary embodiments may use touch sensors with a maximum separation distance TPSS-MD in the second direction DR2 that is less than the maximum width CS-W of the contact surface (e.g., TPSS-MD2) instead of a maximum separation distance TPSS-MD in the second direction DR2 that is equal to or more than the maximum width CS-W of the contact surface (e.g., TPSS-MD1).

Figure 10:
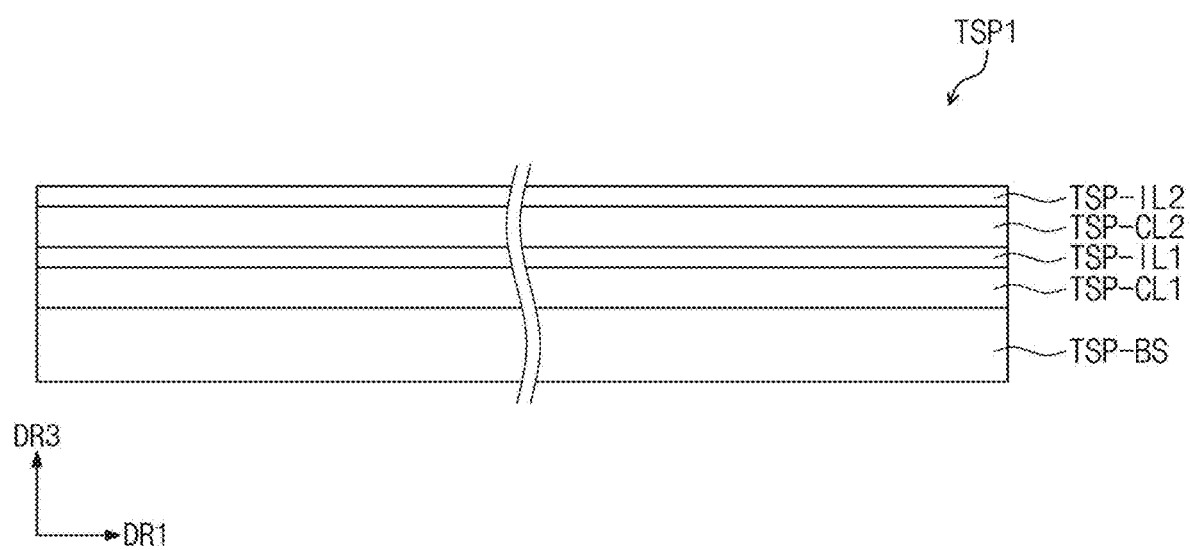
FIG. 10 illustrates a cross-sectional view of a touch panel according to an exemplary embodiment.
Figure 11:
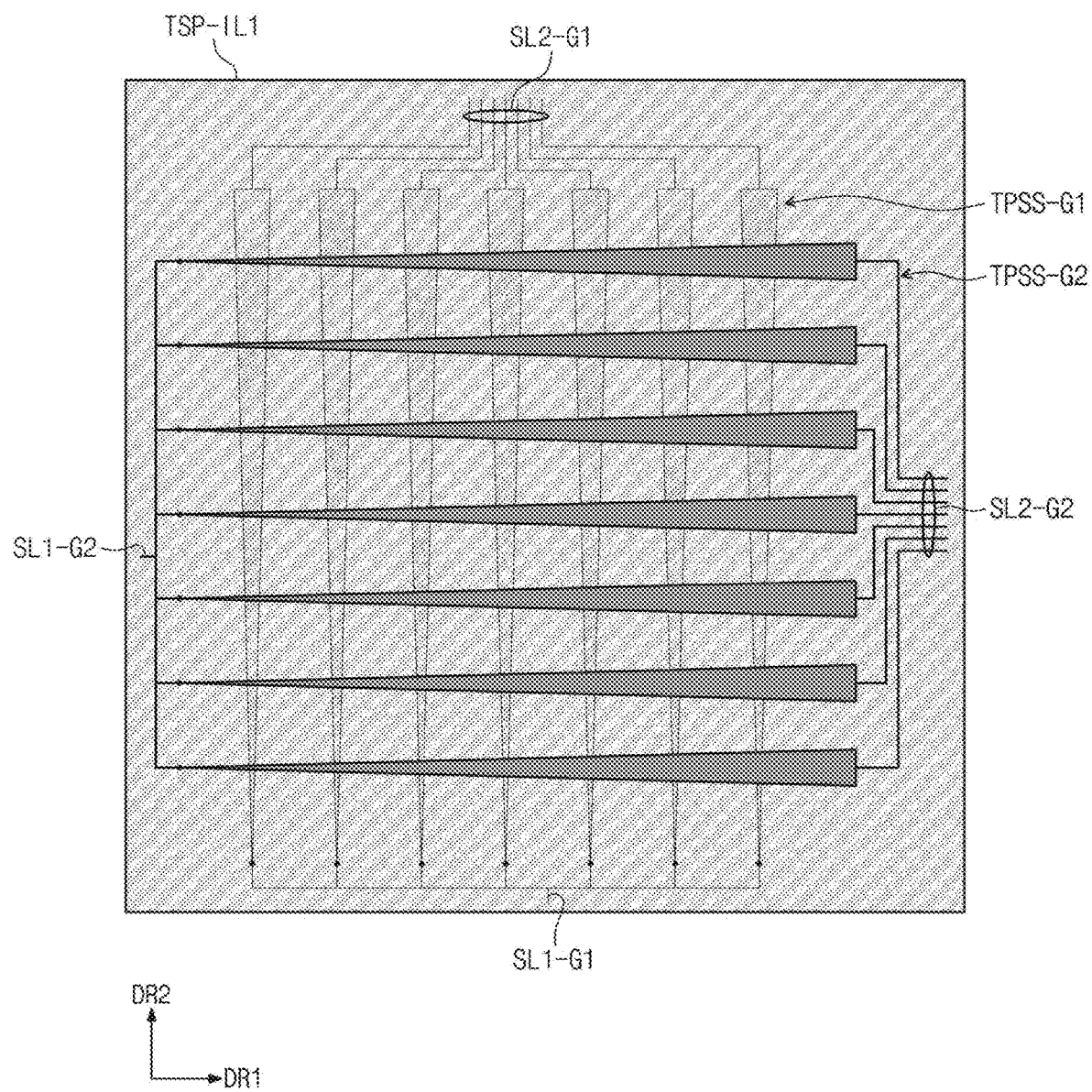
FIG. 11 illustrates a plan view of a touch panel according to an exemplary embodiment.

FIG. 10 illustrates a cross-sectional view of a touch panel TSP1 according to an exemplary embodiment. FIG. 11 illustrates a plan view of a touch panel TSP1 according to an exemplary embodiment. Hereinafter, with reference to FIGS. 10 and 11, the touch panel TSP1 according to an exemplary embodiment will be described. However, a duplicate description of a configuration described with reference to FIGS. 1, 2, 3, 4, 5, 6, 7A, 7B, 7C, 7D, 8, 9A, 9B, 9C, 9D, and 9E will not be repeated.

As illustrated in FIG. 10, a touch panel TPS1 may include a base member TSP-BS, a first conductive layer TSP-CL1, a first insulating layer TSP-IL1, a second conductive layer TSP-CL2, and a second insulating layer TSP-IL2. The first and second conductive layers TSP-CL1 and TSP-CL2 may be substantially the same as the conductive layer TSP-CL illustrated in FIG. 5 and the first and second insulating layers TSP-IL1 and TSP-IL2 may be substantially the same as the insulating layer TSP-IL illustrated in FIG. 5. However, the first and second conductive layers TSP-CL1 and TSP-CL2 are not limited to the same as the conductive layer TSP-CL illustrated in FIG. 5 and the first and second insulating layers TSP-IL1 and TSP-IL2 are not limited to the same as the insulating layer TSP-IL illustrated in FIG. 5.

The first conductive layers TSP-CL1 in FIG. 10 may include first sensors TPSS-G1 and signal lines SL1-G1 and SL2-G1 of a first group which are illustrated in FIG. 11. Each of the first sensors TPSS-G1 may extend along the second direction DR2 and may be arranged along the first direction DR1. The signal lines SL1-G1 and SL2-G1 of the first group may include first and second signal lines SL1-G1 and SL2-G1. The first signal line SL1-G1 may be commonly connected to first ends of the first sensors TPSS-G1 and may receive a driving voltage. The second signal lines SL2-G1 may be respectively connected to the second ends of the first sensors TPSS-G1, which is opposite the first ends of the first sensors TPSS-G1.

The second conductive layers TSP-CL2 in FIG. 10 may include second sensors TPSS-G2 and signal lines SL1-G2 and SL2-G2 of a second group which are illustrated in FIG. 11. Each of the second sensors TPSS-G2 may extend along the first direction DR1 and may be arranged along the second direction DR2. The signal lines SL1-G2 and SL2-G2 of the second group may include a third signal line SL1-G2 and fourth signal lines SL2-G2. The third signal line SL1-G2 may be commonly connected to first ends of the second sensors TPSS-G2 and may receive a driving voltage. The fourth signal lines SL2-G2 may be respectively connected to the second ends of the second sensors TPSS-G2, which is opposite the first end.

The first and second sensors TPSS-G1 and TPSS-G2 may be independently driven. The first and second sensors TPSS-G1 and TPSS-G2 may perform dual sensing for a single touch input. Accordingly, accuracy and precision of the touch input sensing may be improved.

Figure 12A:
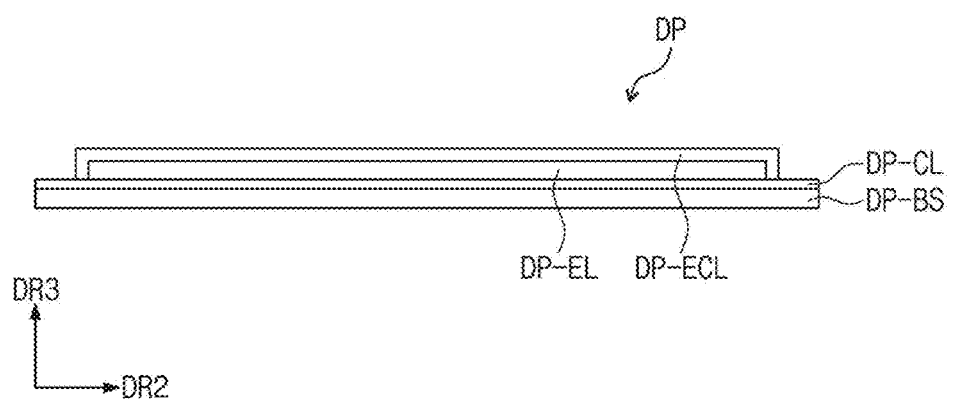
FIG. 12A illustrates a cross-sectional view of a touch panel according to an exemplary embodiment.
Figure 12B:
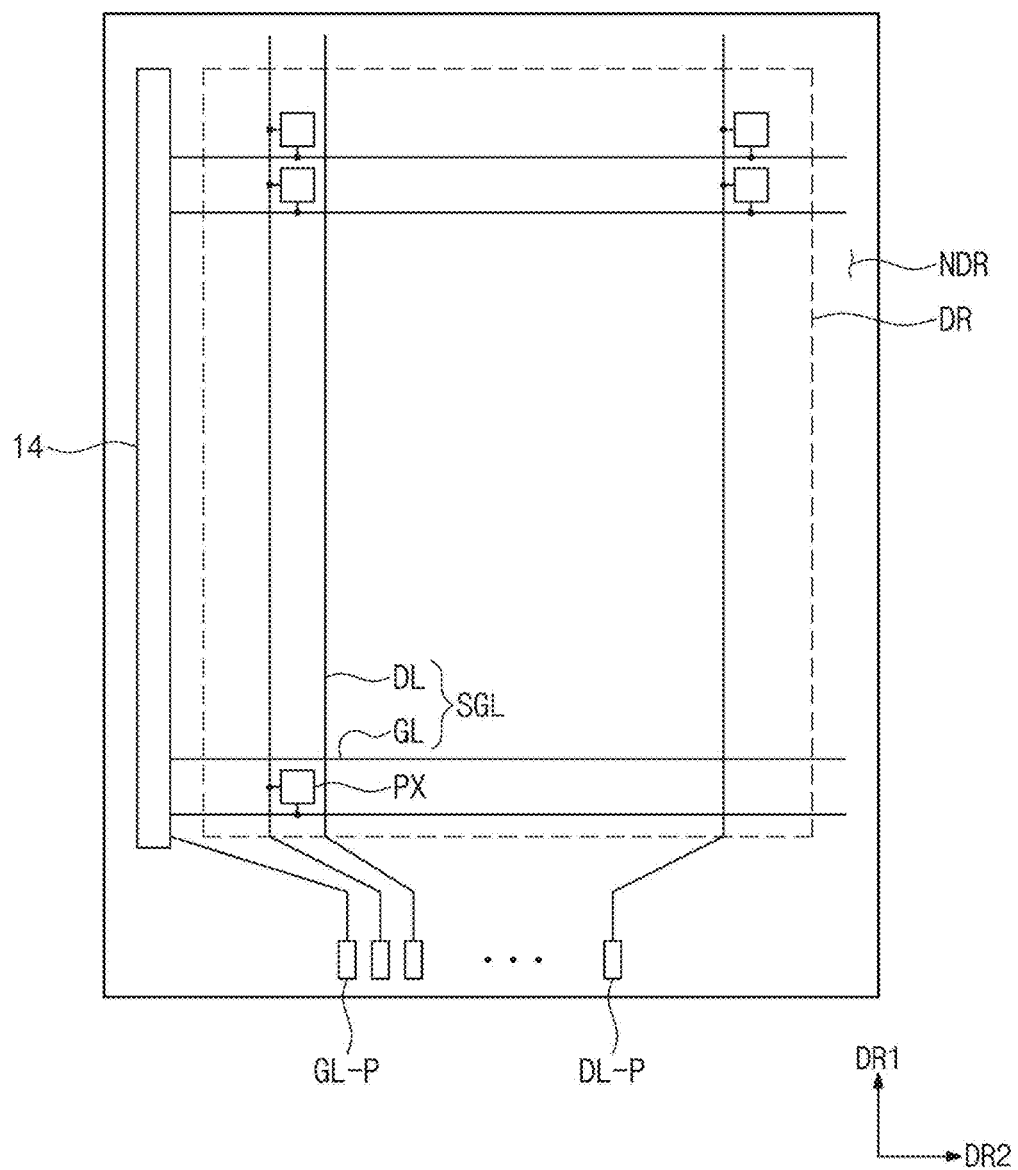
FIG. 12B illustrates a plan view of a display panel according to an exemplary embodiment.

FIG. 12A illustrates a cross-sectional view of a display panel according to an exemplary embodiment. FIG. 12B illustrates a plan view of a display panel according to an exemplary embodiment. Hereinafter, a display panel DP according to an exemplary embodiment will be described with reference to FIGS. 12A to 12B. For clarity and brevity, but by no means limiting, exemplary embodiments are describe below as including an organic light emitting display panel.

As illustrated in FIG. 12A, the display panel DP may include a base member DP-BS, a circuit layer DP-CL, an element layer DP-EL, and an encapsulation layer DP-ECL. Although not separately illustrated, the display panel DP may further include optical members disposed on the encapsulation layer DP-ECL. For example, the display panel DP may include a phase delay plate and a polarizer.

The base member DP-BS may include at least one plastic film such as polyimide (PI), polyethyleneterephthalate (PET), polyethylenenaphthalate (PEN), polyethersulphone (PES), and/or fiber reinforced plastics (FRP). For example, the base member DP-BS may include two plastic films. The base plate DP-BS may include inorganic films such as silicon nitride film and/or silicon oxide film. The base plate may include one or more inorganic films disposed between two plastic films.

The circuit layer DP-CL may include a plurality of signal lines SGL and electronic devices that are provided in the display panel DP. The circuit layer DP-CL may include a plurality of insulating layers insulating parts of the signal lines SGL and the electronic devices.

As illustrated in FIGS. 12A and 12B, the circuit layer DP-CL may include a plurality of signal lines SGL. The plurality of signal lines SGL may include gate lines GL arranged along the first directional axis DR1 and data lines DL arranged along the second directional axis DR2. The gate lines GL and the data lines DL may be respectively connected to corresponding pixels PX among a plurality of pixels PX. The circuit layer DP-CL may include circuits of the pixel PX. For example, the circuit layer DP-CL may include at least one thin film transistor and at least one capacitor. The circuit layer DP-CL may further include a gate driver 14 disposed on one side of a non-display region NDA.

The gate lines GL and the data lines DL may respectively include agate pad unit GL-P and data pad units DL-P which are disposed on the non-display region NDA. The gate pad unit GL-P and the data pad units DL-P may be connected to a flexible circuit board (not shown).

The element layer DP-EL may include display elements. Although not illustrated, the element layer DP-EL may include an organic light emitting diode. The element layer DP-EL may further include electronic elements assisting the organic light emitting diode.

The encapsulation layer DP-ECL may seal the element layer DP-EL. The element layer DP-EL may include thin film encapsulation layers (TFE). The thin film encapsulation layer may include a plurality of inorganic thin films and a plurality of organic thin films. The encapsulation layer DP-ECL may be replaced with an encapsulation substrate. The encapsulation substrate may be disposed spaced apart from the base member DP-BS with the element layer DP-EL therebetween. A sealing agent may form a predetermined space along edges of the encapsulation substrate and the base member DP-BS.

The base member TSP-BS of the touch panel TSP described with reference to FIG. 5 may be disposed on the encapsulation layer DP-ECL or the encapsulation substrate. In an exemplary embodiment, the conductive layer TSP-CL of the touch panel TSP illustrated in FIG. 5 is directly disposed on the encapsulation layer DP-ECL or the encapsulation substrate. In other words, the sensors TPSS and signal lines SL1 and SL2 illustrated in FIG. 6 may be directly disposed on the encapsulation layer DP-ECL or the encapsulation substrate.

According to the above description, since the number of sensors and signal lines may be reduced, a touch panel with a simplified structure may be provided. Failures such as short circuits between sensors and between signal lines may be reduced, and the manufacturing process may be simplified (i.e., manufacturing cost may be reduced) based on this structure.

Since the intensity of pressure applied to a display device is obtained when a touch is input, a variety of applications may be performed. A coordinate of the touch input may be calculated by using information on the intensity of pressure.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An electronic device, comprising:
a display device comprising a display panel, a touch panel, and a touch sensing circuit configured to sense a touch input; and
an input pen configured to provide, to the touch sensing circuit, information on intensity of pressure applied to the display device,
wherein the touch panel comprises:
a plurality of touch pressure sensors spaced apart from each other, extending in a first direction, and arranged in a second direction, each touch pressure sensor having an area per unit length that increases along the first direction, having a resistance that varies with an intensity of pressure and an area of pressure applied to the touch pressure sensors, and having a triangular shape, and
signal lines connected to the touch pressure sensors,
wherein the touch sensing circuit senses a resistance change value of the touch pressure sensors,
wherein at the same pressure of the input pen, the resistance change rate applied to one of the touch pressure sensors increases as an overlapping area between a contact surface of the input pen and the one of the touch pressure increases, and
wherein the touch pressure sensors do not overlap each other in the first direction, and the touch pressure sensors overlap each other in the second direction.

2. The electronic device of claim 1, wherein the touch pressure sensors have the same shape as each other.

3. The electronic device of claim 2, wherein the signal lines comprise:
a first signal line commonly connected to each first end of the touch pressure sensors and configured to receive a driving voltage, and
second signal lines separately connected to each second end of the touch pressure sensors.

4. The electronic device of claim 2, wherein a width of the each of the touch pressure sensors linearly increases along the first direction of the each of the touch pressure sensors.

5. The electronic device of claim 2, wherein each of the touch pressure sensors comprises an n-th, where n is a natural number of 1 or more, sensor part and an (n+1)th sensor part having a width wider than a width of the n-th sensor part.

6. The electronic device of claim 2, wherein:
each of the touch pressure sensors comprises a plurality of sensor parts with different lengths and connection lines connecting the plurality of sensor parts to each other, and
the plurality of sensor parts are arranged in the first direction crossing the second direction and the plurality of sensor parts are aligned at one end by a reference line.

7. The electronic device of claim 1, wherein the input pen comprises:
an input tip in contact with the display device,
an input pressure sensor configured to sense a pressure applied to the display device by the input tip,
a signal generating circuit configured to generate a wireless signal comprising information on the intensity of pressure applied to the display device based on a signal received from the input pressure sensor, and
a transmitter configured to transmit the wireless signal.

8. The electronic device of claim 7, wherein a maximum width of the each of the touch pressure sensors in the second direction is less than a maximum width defined on a contact surface of the input tip.

9. The electronic device of claim 7, wherein a maximum separation distance between adjacent two of the touch pressure sensors in the second direction is less than a maximum width defined on a contact surface of the input tip.

10. The electronic device of claim 7, wherein the touch sensing circuit comprises:
a receiving unit configured to receive the wireless signal,
a current sensing unit configured to sense the resistance change value of the touch pressure sensors, and
a calculating unit configured to calculate a coordinate of the touch input based on the information on the resistance change value and the intensity of pressure of the touch pressure sensors.

11. The electronic device of claim 1, wherein the touch pressure sensors comprises:
first touch pressure sensors having a first shape; and
second touch pressure sensors having a second shape,
wherein the first shape and the second shape are different.

12. The electronic device of claim 1, wherein the touch pressure sensors comprises:
first touch pressure sensors, each of which extends along the first direction and are arranged in the second direction crossing the first direction, and
second touch pressure sensors, each of which extends along the second direction and are arranged in the first direction and are insulated from the first touch pressure sensors.

13. The electronic device of claim 1, wherein the touch pressure sensors and the signal lines are disposed directly on the display panel.

14. A method of driving an electronic device, the method comprising:
generating a touch input on a display device by an input pen;
transmitting a wireless signal comprising information on a pressure intensity applied to the display device from the input pen;
measuring resistance change values of touch pressure sensors having a resistance that varies with the pressure intensity and a pressure area applied to each of the touch pressure sensors, the touch pressure sensors are spaced apart from each other, extending in a first direction, arranged in a second direction, and having a triangular shape; and
calculating a coordinate of the touch input based on resistance change values of the touch pressure sensors and the information on pressure intensity from the wireless signal,
wherein at the same pressure of the input pen, a resistance change rate applied to one of the touch pressure sensors increases as an overlapping area between a contact surface of the input pen and the one of the touch pressure increases, and
wherein the touch pressure sensors do not overlap each other in the first direction, and the touch pressure sensors overlap each other in the second direction.

15. The method of claim 14, wherein the measuring of the resistance change values of the touch pressure sensors comprises:
   measuring current values flowing through the touch pressure sensors, and
   converting the current values into resistance change values.

16. The method of claim 15, wherein the calculating of the coordinate of the touch input comprises:
   distinguishing a ghost touch input from a valid touch input by using information of an overlapping area between a contact surface of an input tip of the input pen and the touch pressure sensors, and
   calculating a coordinate of the valid touch input.

17. The method of claim 16, wherein each of the touch pressure sensors extends along the first direction and the touch pressure sensors are arranged in the second direction crossing the first direction.

18. The method of claim 17, wherein a maximum width of each of the touch pressure sensors in the second direction is less than a maximum width defined on the contact surface.

19. The method of claim 17, wherein a maximum separation distance between two adjacent touch pressure sensors in the second direction is less than a maximum width defined on the contact surface.

* * * * *